United States Patent
Chen et al.

(10) Patent No.: US 10,638,560 B2
(45) Date of Patent: Apr. 28, 2020

(54) LED DRIVER WITH A SILICON CONTROLLED DIMMER AND CONTROL METHOD THEREOF

(71) Applicant: Silergy Semiconductor Technology (Hangzhou) LTD, Hangzhou, ZheJiang Province (CN)

(72) Inventors: Huiqiang Chen, Hangzhou (CN); Zhishuo Wang, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/408,615

(22) Filed: May 10, 2019

(65) Prior Publication Data

US 2019/0364626 A1 Nov. 28, 2019

(30) Foreign Application Priority Data

May 28, 2018 (CN) .......................... 2018 1 0525675

(51) Int. Cl.
*H05B 33/00* (2006.01)
*H05B 33/08* (2020.01)

(52) U.S. Cl.
CPC ..... *H05B 33/0812* (2013.01); *H05B 33/0851* (2013.01)

(58) Field of Classification Search
CPC ............ H05B 33/0845; H05B 33/0815; H05B 33/0809; H05B 33/0851; H05B 37/02
See application file for complete search history.

(56) References Cited

U.S. PATENT DOCUMENTS

| | | | |
|---|---|---|---|
| 8,581,518 B2 | 11/2013 | Kuang et al. | |
| 9,692,316 B1 | 6/2017 | Ryu et al. | |
| 2011/0127925 A1 | 6/2011 | Huang et al. | |
| 2016/0366735 A1* | 12/2016 | Tian | H02M 1/4208 |
| 2017/0208660 A1* | 7/2017 | Hilgers | H05B 33/0845 |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |

FOREIGN PATENT DOCUMENTS

CN 106211485 A 8/2016

* cited by examiner

*Primary Examiner* — Monica C King
(74) *Attorney, Agent, or Firm* — Michael C. Stephens, Jr.

(57) ABSTRACT

An LED driver with a silicon-controlled dimmer, can include: a supplementary current generating circuit configured to generate a supplementary current to ensure that an input current of the LED driver meets conduction requirements of the silicon-controlled dimmer; and where the supplementary current is determined in accordance with a drive current flowing through an LED load and a holding current of the silicon-controlled dimmer.

16 Claims, 7 Drawing Sheets

LED DRIVER WITH A SILICON CONTROLLED DIMMER AND CONTROL METHOD THEREOF

RELATED APPLICATIONS

This application claims the benefit of Chinese Patent Application No. 201810525675.6, filed on May 28, 2018, which is incorporated herein by reference in its entirety.

FIELD OF THE INVENTION

The present invention generally relates to the field of power electronics, and more particularly to LED drivers, with a silicon-controlled dimmer and associated control methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A silicon-controlled dimmer is a commonly used type of dimmer. The silicon-controlled dimmer can achieve dimming by applying a phase control approach whereby the silicon-controlled dimmer is controlled to be turned on every half period of the sine wave, in order to obtain the same conduction angle. By adjusting the chopped phase of the silicon-controlled dimmer, the conduction angle can be changed, thereby achieving dimming.

A silicon-controlled dimmer can utilize a triode alternating current switch (TRIAC). When a gate of the TRIAC is trigged to switch from being turned off to being turned off, a minimum current is needed for the turn-on of the TRIAC, which is called the latching current. After the TRIAC is turned on, a minimum current to maintain conduction of the TRIAC is called a holding current. Typically, the holding current is related to junction temperature, and the latching current is, e.g., 2-4 times greater than the holding current. In addition, conduction of a silicon-controlled dimmer can be maintained by adding extra bus current or maintaining a larger constant current of the LED load, thereby possibly resulting in large losses of the LED driver and relatively low efficiency.

Figure 1:
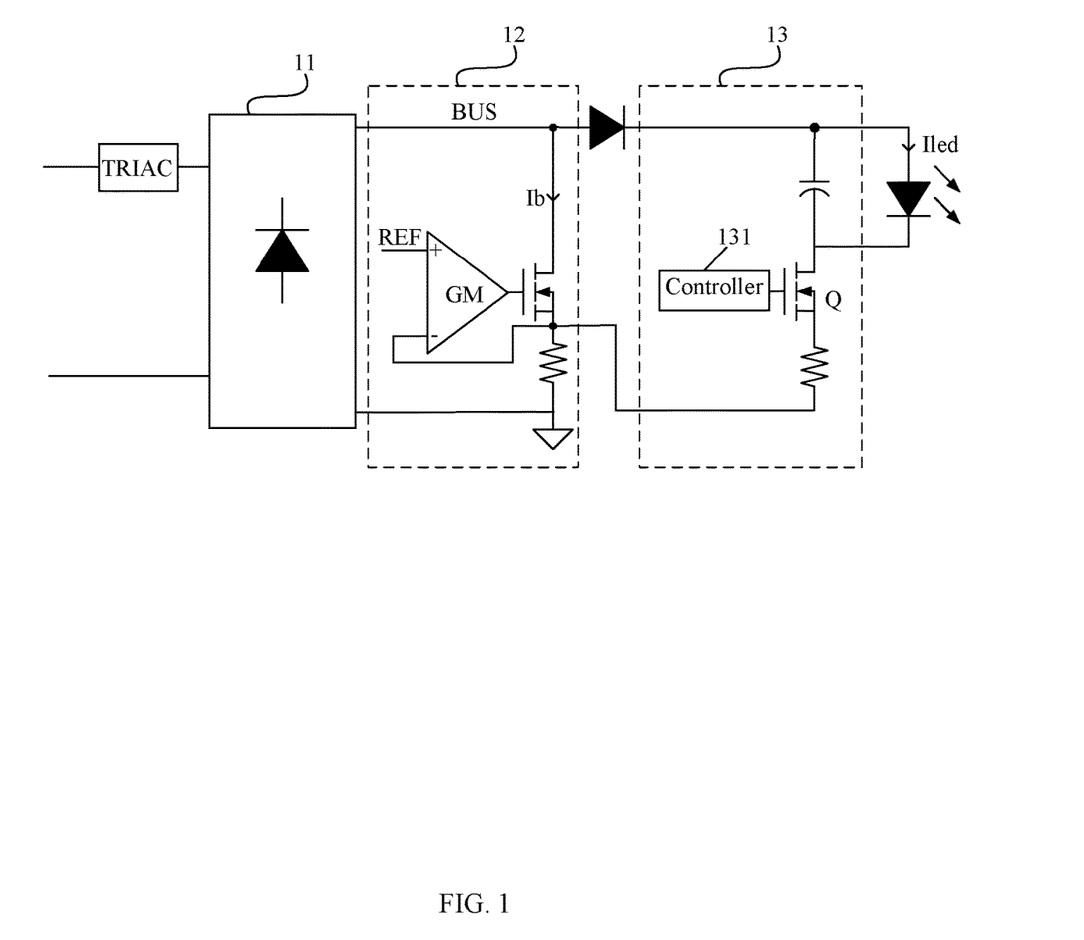
FIG. 1 is a schematic block diagram of an example LED driver.

Referring now to FIG. 1, shown is a schematic block diagram of an example LED driver. In this example, the LED driver can include silicon-controlled dimmer TRIAC, rectifier circuit 11, bleeder circuit 12, and linear regulation circuit 13. Silicon-controlled dimmer TRIAC can connect between an AC input port and rectifier circuit 11. Rectifier circuit 11 can convert an AC signal chopped by silicon-controlled dimmer TRIAC to a DC signal that is provided to a DC bus "BUS." Bleeder circuit 12, coupled to the DC bus, can draw bleed current Ib from the DC bus, in order to provide the latching current to trigger silicon-controlled dimmer TRIAC to be turned on, or in order to provide the holding current to maintain conduction of silicon-controlled dimmer TRIAC. Also, linear regulation circuit 13 can adjust a drive current of an LED load, in order to make the drive current substantially constant. In this example, linear regulation circuit 13 can include transistor Q and controller 131 for controlling transistor Q.

Figure 2:
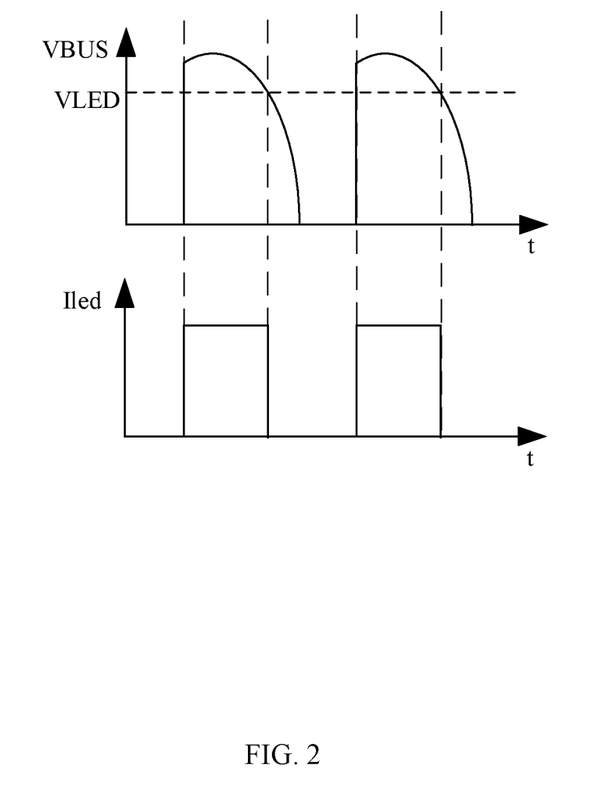
FIG. 2 is a waveform diagram of a first example operation of an LED driver.

Referring now to FIG. 2, shown is a waveform diagram of a first example operation of an LED driver. In this particular example, when bus voltage VBUS is greater than conduction voltage VLED of the LED load, drive current Iled of the LED load can be controlled by controller 131 to be a larger constant value. Thus, the input current of the LED driver can maintain conduction of silicon-controlled dimmer TRIAC. However, the current flowing through transistor Q can be relatively large with this approach, such that losses of transistor Q are also relatively large.

Figure 3:
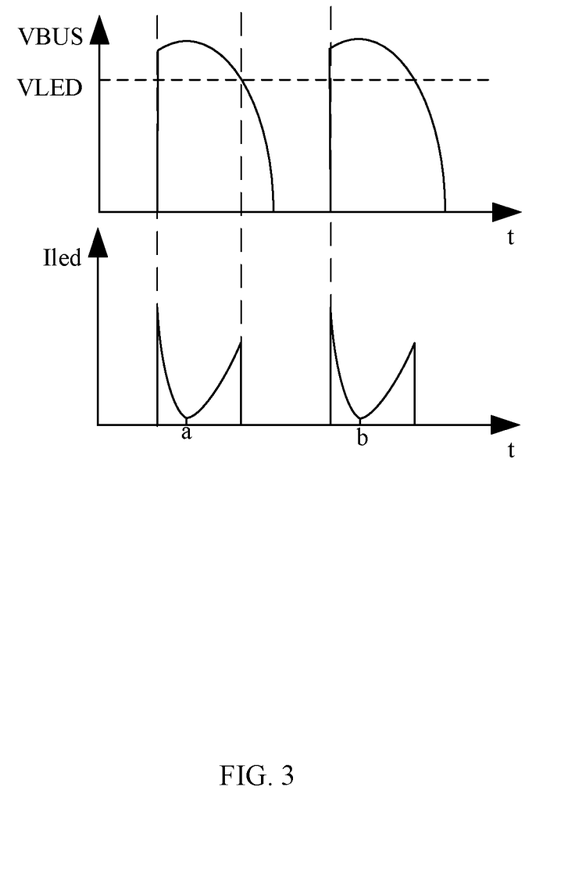
FIG. 3 is a waveform diagram of a second example operation of an LED driver.

Referring now to FIG. 3, shown is a waveform diagram of a second example operation of an LED driver. In this example, transistor Q can be controlled by controller 131, such that a change trend of drive current Iled of the LED load may be opposite to a change trend of bus voltage VBUS. When bus voltage VBUS is greater than conduction voltage VLED of the LED load, the current flowing through transistor Q (e.g., drive current Iled) can decrease with the increase of bus voltage VBUS. Since loss P of transistor Q can satisfy the equation: P=(VBUS−VLED)*Iled, the loss can be reduced. However, drive current Iled reaches a smaller value around points "a" and "b," such that the input current of the LED driver may not be able to maintain conduction of silicon-controlled dimmer TRIAC. In order to maintain the conduction of silicon-controlled dimmer TRIAC, the bleeder current may be drawn by bleeder circuit 12 after the LED load is turned on, such that the sum of bleeder current Ib and drive current Iled can meet conduction requirements of silicon-controlled dimmer TRIAC. In this way, the loss of the LED driver can be equal to VBUS*Ib, and thus can be reduced compared to the above approach. However, extra loss that can be caused by a large bleeder current may also make the loss of the LED driver relatively large.

In one embodiment, an LED driver with a silicon-controlled dimmer, can include: (i) a supplementary current generating circuit configured to generate a supplementary current to ensure that an input current of the LED driver meets conduction requirements of the silicon-controlled dimmer; and (ii) where the supplementary current is determined in accordance with a drive current flowing through an LED load and a holding current of the silicon-controlled dimmer.

Figure 4:
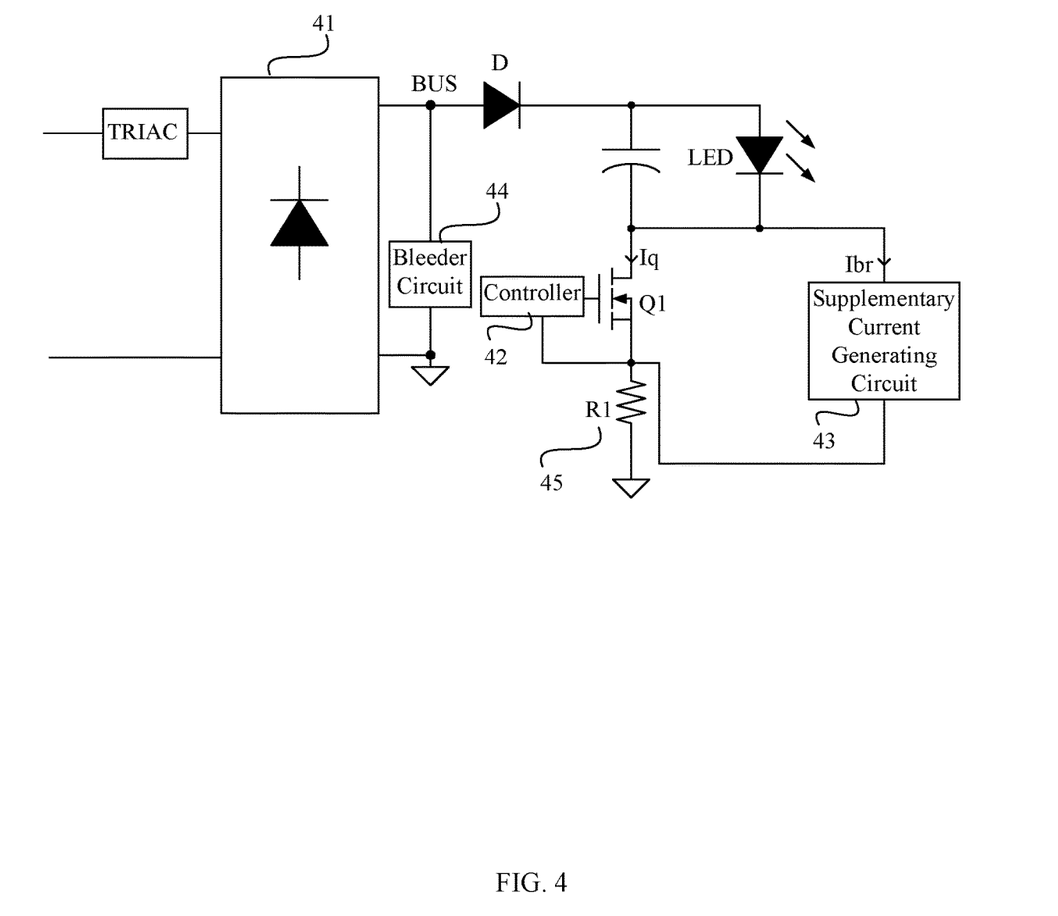
FIG. 4 is a schematic block diagram of a first example LED driver, in accordance with embodiments of the present invention.

Referring now to FIG. 4, shown is a schematic block diagram of a first example LED driver, in accordance with embodiments of the present invention. In this example, the LED driver can include silicon-controlled dimmer TRIAC, rectifier circuit 41, bleeder circuit 44, controller 42, transistor Q1, sampling circuit 45, and supplementary current generating circuit 43. Silicon-controlled dimmer TRIAC can be coupled between AC input port and rectifier circuit 41. Rectifier circuit 41 can convert an AC signal chopped by silicon-controlled dimmer TRIAC to a DC signal that is provided to a DC bus "BUS." Bleeder circuit 44, coupled to the DC bus, can draw extra DC bus current along with the LED load to reach the latching current of silicon-controlled dimmer TRIAC when silicon-controlled dimmer TRIAC is turned on, and may be turned off after the LED load is turned on, in order to reduce the loss.

In this example, transistor Q1 can be arranged on a current path of the LED load. Controller 42 can adjust current Iq that flows through transistor Q1 according to a drive current sampling signal that characterizes the drive current flowing through the LED load. Sampling circuit 45 can connect between a source terminal of transistor Q1 and ground for obtaining the drive current sampling signal. In this example, sampling circuit 45 can include resistor R1. Those skilled in the art will recognize that any suitable circuit that can obtain the drive current sampling signal can be applied herein.

In this particular example, the LED driver can also include diode D coupled to the DC bus to prevent the current of the LED load from flowing back to the AC input port, thereby improving the stability of the LED driver. Also, the change trend of the drive current of the LED load can be controlled by controller 42 to be opposite to the change trend of the rectified output voltage (e.g., bus voltage VBUS), such that the current flowing through transistor Q1 can be reduced, thereby further reducing the loss of the LED driver. Further, controller 42 can control the drive voltage of transistor Q1 according to the drive current sampling signal, such that the average of the drive current of the LED load can follow an expected value, thereby ensuring stable operation of the LED load.

Supplementary current generating circuit 43, coupled in parallel with transistor Q1, can generate supplementary current Ibr to enable the input current of the LED driver to meet conduction requirements of silicon-controlled dimmer TRIAC. For example, the sum of supplementary current Ibr and current Iq flowing through transistor Q1 may be greater than or equal to the holding current of silicon-controlled dimmer TRIAC, such that the input current of the LED driver can meet conduction requirements of silicon-controlled dimmer TRIAC. In addition, supplementary current Ibr can be greater than or equal to the holding current of silicon-controlled dimmer TRIAC, such that silicon-controlled dimmer TRIAC can be normally turned on when current Iq flowing through transistor Q1 decreases to around zero.

From the above, the loss of the LED driver can be expressed as (VBUS−VLED)*Ibr. Compared to the loss in the example of FIG. 3 (e.g., VBUS*Ib), the loss of the LED driver in this example is greatly reduced since voltage VBUS−VLED is less than bus voltage VBUS. In this example, the supplementary current generating circuit can be provided on the current path of the LED load, such that the input current may meet conduction requirements of the silicon-controlled dimmer, thereby reducing the loss of the LED driver and improving the efficiency of the LED driver.

Figure 5:
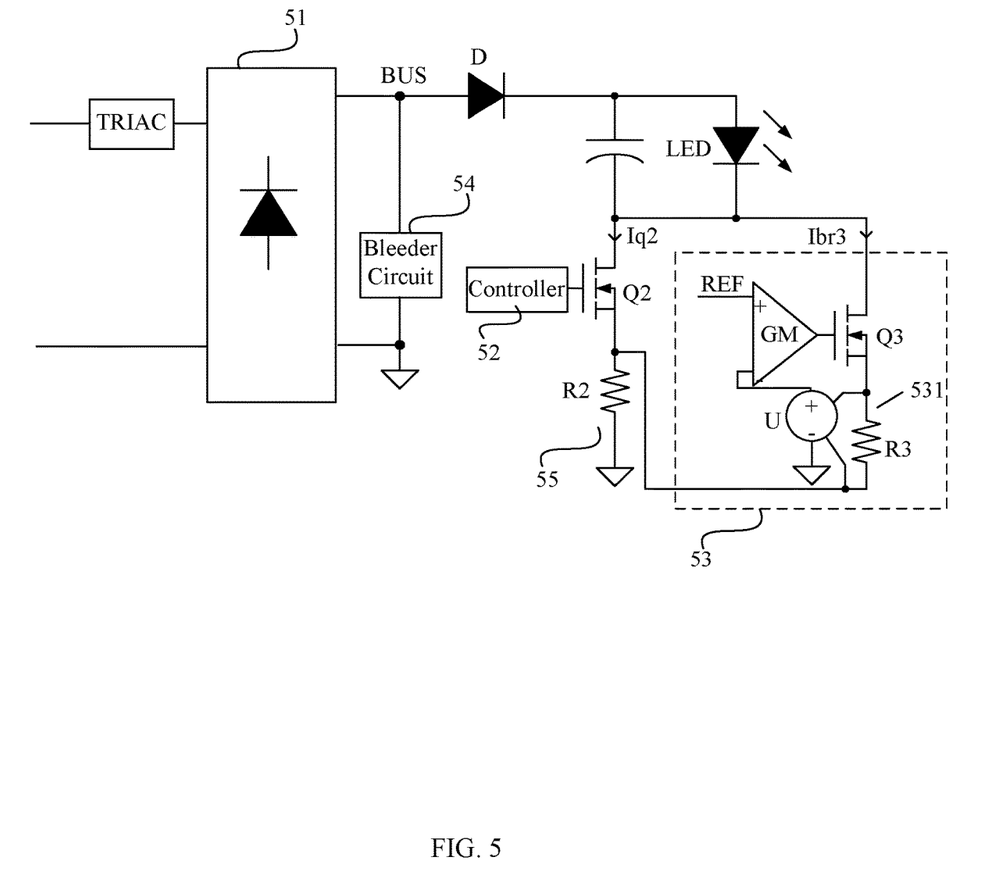
FIG. 5 is a schematic block diagram of a second example LED driver, in accordance with embodiments of the present invention.

Referring now to FIG. 5, shown is a schematic block diagram of a second example LED driver, in accordance with embodiments of the present invention. In this example, the LED driver can include silicon-controlled dimmer TRIAC, rectifier circuit 51, bleeder circuit 54, controller 52, transistor Q2, sampling circuit 55, and supplementary current generating circuit 53. Similarly, silicon-controlled dimmer TRIAC can be coupled between AC input port and rectifier circuit 51. Rectifier circuit 51 may convert the AC signal chopped by silicon-controlled dimmer TRIAC to the DC signal that is output to the DC bus. Bleeder circuit 54, coupled to the DC bus, can draw extra DC bus current along with the LED load to reach the latching current of silicon-controlled dimmer TRIAC when silicon-controlled dimmer TRIAC is turned on, and may be turned off after the LED load is turned on to reduce the loss.

Controller 52 can adjust current Iq2 flowing through transistor Q2 according to the drive current sampling signal that characterizes the drive current flowing through the LED load. Sampling circuit 55 can connect between a source terminal of transistor Q2 and ground to obtain the drive current sampling signal. In this particular example, sampling circuit 55 can include resistor R2. It should be understood for those skilled in the art that any suitable circuit that can obtain the drive current sampling signal can be applied herein.

In this example, the LED driver can also include diode D coupled to the DC bus to prevent the current of the LED load from flowing back to the AC input port, thereby improving the stability of the LED driver. Also, the change trend of the drive current of the LED load can be controlled by controller 42 to be opposite to the change trend of the rectified output voltage (e.g., bus voltage VBUS), such that the current flowing through transistor Q2 may be reduced, thereby further reducing the loss of the LED driver. Further, controller 52 can control the drive voltage of transistor Q2 according to the drive current sampling signal, such that the average of the drive current of the LED load can follow the expected value, thereby ensuring stable operation of the LED load.

Supplementary current generating circuit 53, coupled in parallel with transistor Q2, can generate supplementary current Ibr3 to enable the input current of the LED driver to meet conduction requirements of silicon-controlled dimmer TRIAC. Supplementary current generating circuit 53 can include transistor Q3, error amplifier GM, and sampling circuit 531. Sampling circuit 531 can include resistor R3 coupled between a source of transistor Q3 and the source of transistor Q2, and controlled voltage source U. Also, sampling circuit 531 can obtain a supplementary current sampling signal for characterizing supplementary current Ibr3 at an output terminal of voltage source U.

In this particular example, sampling circuit 531 can include resistor R3 and controlled voltage source U, and resistor R3 can connect between two control terminals of voltage source U. It should be understood by those skilled in the art that any suitable circuit that can obtain the appropriate current sampling signal can be applied herein. Input terminals of error amplifier GM can respectively receive the supplementary current sampling signal and reference signal REF that characterizes the expected value of supplementary current Ibr3. An output terminal of error amplifier GM can generate the drive voltage for transistor Q3 to adjust the current flowing through transistor Q3 (e.g., supplementary current Ibr3).

When the LED load is turned on, supplementary current Ibr3 can be adjusted, such that the sum of supplementary current Ibr3 and current Iq2 flowing through transistor Q2 can be greater than or equal to the holding current of silicon-controlled dimmer TRIAC, in order for the input current of the LED driver to meet conduction requirements of silicon-controlled dimmer TRIAC. Further, supplementary current Ibr3 can be adjusted to be greater than or equal to the holding current of silicon-controlled dimmer TRIAC, such that the input current of the LED driver can meet conduction requirements of silicon-controlled dimmer TRIAC.

From the above, the loss of the LED driver in this example is (VBUS−VLED)*Ibr3. Compared to the loss in the example of FIG. 3 (e.g., VBUS*Ib), the loss of the LED driver in this example is greatly reduced. In this example, the supplementary current generating circuit is provided on the current path of the LED load, such that the input current of the LED driver can meet conduction requirements of the silicon-controlled dimmer, thereby reducing the loss of the LED driver and improving the efficiency of the LED driver.

Figure 6:
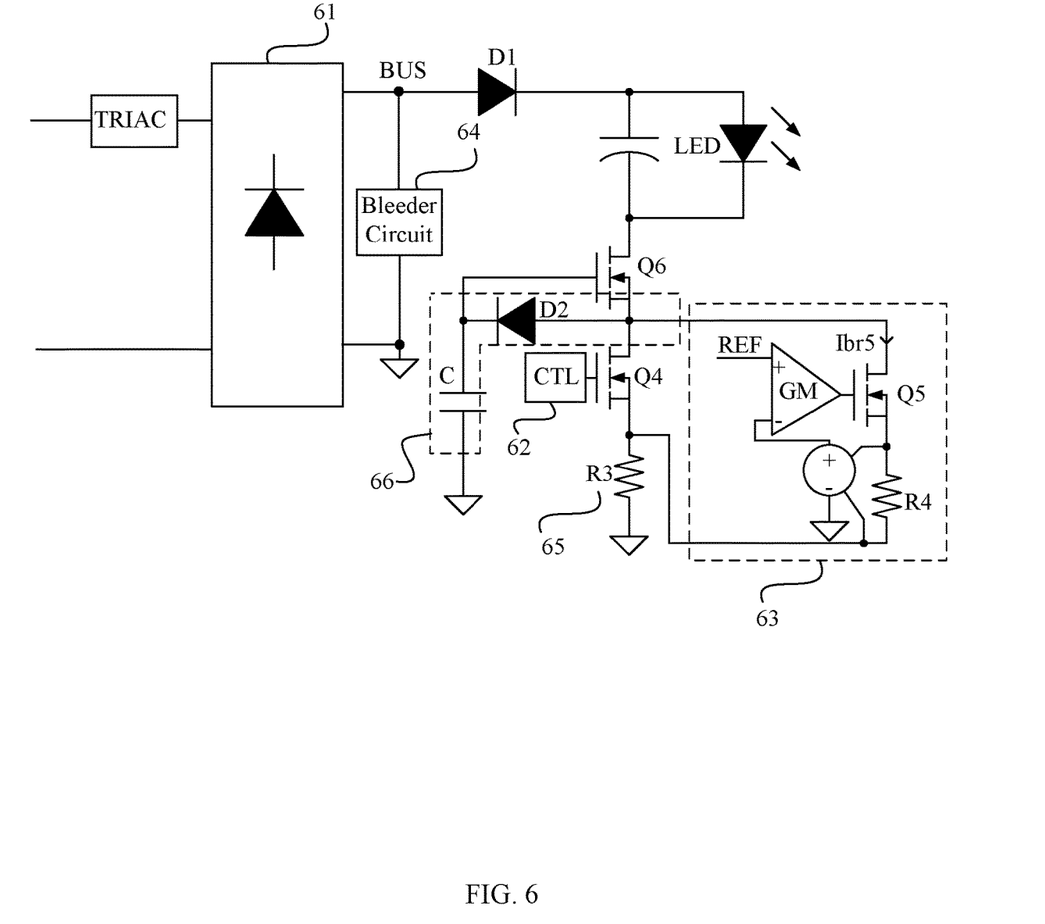
FIG. 6 is a schematic block diagram of a third example LED driver, in accordance with embodiments of the present invention.

Referring now to FIG. 6, shown is a schematic block diagram of a third example LED driver, in accordance with embodiments of the present invention. In this example, the LED driver can include silicon-controlled dimmer TRIAC, rectifier circuit 61, bleeder circuit 64, controller 62, transistor Q4, sampling circuit 65, supplementary current generating circuit 63, diode D1, transistor Q6, and controller 66. In this particular example, transistor Q6 can connect between the LED load and a drain terminal of transistor Q4, and may be controlled by controller 66 to be turned on continuously when the LED driver is turned on. Also, controller 66 can include diode D2 and capacitor C. An anode of diode D2 can connect to the drain of transistor Q4, and to a drain of transistor Q5 in supplementary current generating circuit 63. A cathode of diode D2 can connect to a gate terminal of transistor Q6. Capacitor C can connect between the gate of transistor Q6 and ground, and may control the drive voltage for transistor Q6 by the charge and discharge characteristics of the circuit. Diode D2 can be provided to prevent a discharging current of capacitor C from flowing backwards when capacitor C is discharged.

In this particular example, the loss of the LED driver can be (VBUS−VLED−VQ6)*Ibr5, where VQ6 is the conduction voltage of transistor Q6, and Ibr5 is a supplementary current flowing through transistor Q5. Therefore, the loss of the LED driver can be further reduced, and the efficiency of the LED driver can be improved. Also, transistor Q6 may be a high voltage transistor, and transistors Q4 and Q5 can be low voltage transistors (while transistors Q2 and Q3 in FIG. 5 are all high voltage transistors). Such a high voltage transistor is a transistor having a higher reverse withstand voltage; that is, the high voltage transistor can withstand high reverse voltage without reverse breakdown. Also, manufacturing costs of a high voltage transistor are far higher than manufacturing costs of a low voltage transistor. Thus, the LED driver in this example can reduce manufacturing costs as compared to the LED driver in FIG. 5.

In particular embodiments, a supplementary current generating circuit may be provided on the current path of the LED load, such that the input current of the LED driver can meet conduction requirements of the silicon-controlled dimmer, thereby reducing the loss of the LED driver and improving the efficiency of the LED driver.

Figure 7:
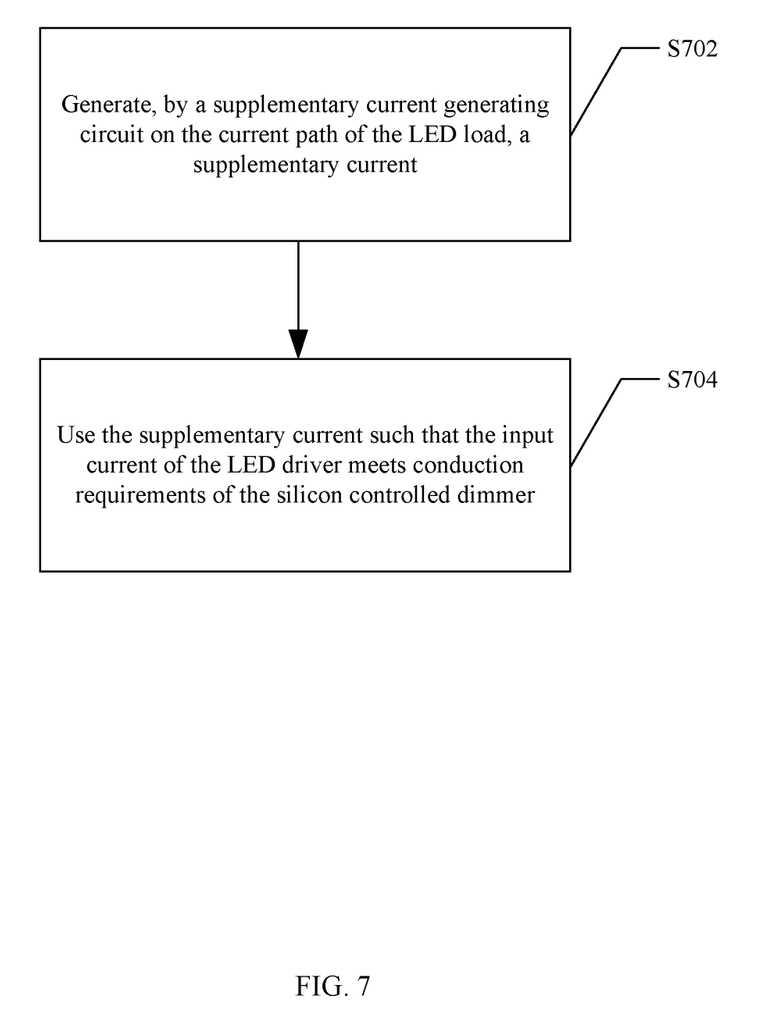
FIG. 7 is a flow diagram of an example control method for an LED driver, in accordance with embodiments of the present invention.

Referring now to FIG. 7, shown is a flow diagram of an example control method for an LED driver in accordance with embodiments of the present invention. In S702, the supplementary current generating circuit (e.g., 43) provided on the current path of the LED load can generate a supplementary current (e.g., Ibr). In S704, the supplementary current can be used such that the input current of the LED driver meets conduction requirements of the silicon-controlled dimmer. This example control method can also include adjusting the first current (e.g., Iq) flowing through the first transistor (e.g., Q1) according to the drive current sampling signal, which characterizes the drive current of the LED load. The first transistor can connect in parallel with the supplementary current generating circuit (see, e.g., FIG. 4). This example control method can also include controlling the first transistor, such that the change trend of the drive current of the LED load is opposite to the change trend of the rectified output voltage.

By adjusting the supplementary current, the sum of the supplementary current and the first current flowing through the first transistor may be greater than or equal to the holding current of the silicon-controlled dimmer, in order to ensure that the silicon-controlled dimmer can normally conduct. By adjusting the supplementary current to be greater than or equal to the holding current of the silicon-controlled dimmer, the silicon-controlled dimmer can normally conduct when the first current flowing through the first transistor decreases to around zero. In this example, the supplementary current generating circuit may be provided on the current path of the LED load, such that the input current of the LED driver meets conduction requirements of the silicon-controlled dimmer, thereby reducing the loss of the LED driver and improving the efficiency of the LED driver.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:
1. An LED driver with a silicon-controlled dimmer, the LED driver comprising:
   a) a first transistor arranged on a current path of an LED load;
   b) a supplementary current generating circuit coupled in parallel with said first transistor at source and drain terminals thereof, wherein said supplementary current generating circuit is configured to generate a supplementary current to ensure that an input current of said LED driver meets conduction requirements of said silicon-controlled dimmer; and c) wherein said supplementary current is determined in accordance with a drive current flowing through said LED load and a holding current of said silicon-controlled dimmer.

2. The LED driver of claim 1, further comprising a first controller configured to adjust a first current flowing through said first transistor according to a drive current sampling signal, wherein said drive current sampling signal characterizes said drive current flowing through said LED load.

3. The LED driver of claim 2, wherein the sum of said supplementary current and said first current is greater than or equal to said holding current of said silicon-controlled dimmer.

4. The LED driver of claim 3, wherein said supplementary current is greater than or equal to said holding current of said silicon-controlled dimmer.

5. The LED driver of claim 2, wherein said first controller is configured to control said first transistor, such that a change trend of said drive current is opposite to a change trend of a DC bus.

6. The LED driver of claim 2, wherein said first controller is configured to control a drive voltage of said first transistor, such that an average of said drive current follows an expected value.

7. The LED driver of claim 2, wherein said supplementary current generating circuit comprises:
   a) a second transistor;
   b) a first sampling circuit coupled between a source terminal of said second transistor and said source terminal of said first transistor, and being configured to obtain a supplementary current sampling signal for characterizing said supplementary current and said drive current sampling signal; and
   c) an error amplifier configured to receive said supplementary current sampling signal and a reference signal that characterizes an expected value of said supplementary current, and to generate a drive voltage of said second transistor, in order to adjust a current flowing through said second transistor, thereby adjusting said supplementary current.

8. The LED driver of claim 7, further comprising a second sampling circuit coupled between said source terminal of said first transistor and aground ground, and being configured to obtain said drive current sampling signal.

9. The LED driver of claim 7, further comprising:
   a) a third transistor coupled between said LED load and said drain terminal of said first transistor; and
   b) a second controller configured to control said third transistor to be turned on continuously when said LED load is turned on.

10. The LED driver of claim 9, wherein said third transistor is a high voltage transistor, and said first and second transistors are low voltage transistors, wherein a reverse withstand voltage of said third transistor is greater than that of said first and second transistors.

11. The LED driver of claim 9, wherein second controller comprises:
   a) a capacitor coupled between a gate terminal of said third transistor and ground, and being configured to control a drive voltage of said third transistor by being charged and discharged; and
   b) a diode having an anode coupled to a drain terminal of said first transistor, and a cathode coupled to a gate of said third transistor, wherein said diode is configured to prevent said drive current from flowing back to a DC bus.

12. The LED driver of claim 1, further comprising a bleeder circuit coupled to a DC bus, and being configured to be controlled to bleed a bus current.

13. The LED driver of claim 12, wherein said bleeder circuit is configured to be turned off after said LED load is turned on.

14. A method of controlling an LED driver with a silicon-controlled dimmer, the method comprising:
   a) arranging a first transistor on a current path of an LED load;
   b) generating, by a supplementary current generating circuit coupled in parallel with said first transistor at source and drain terminals thereof, a supplementary current in accordance with a drive current flowing through said LED load and a holding current of said silicon-controlled dimmer; and
   c) using said supplementary current to ensure that an input current of said LED driver meets conduction requirements of said silicon-controlled dimmer.

15. The method of claim 14, further comprising adjusting a first current flowing through said first transistor according to a drive current sampling signal for characterizing said drive current flowing through said LED load.

16. The method of claim 15, wherein the sum of said supplementary current and said first current is greater than or equal to said holding current of said silicon-controlled dimmer.

* * * * *